United States Patent [19]
Houghton

[11] 3,868,437
[45] *Feb. 25, 1975

[54] METHOD FOR FORMING ARTICLES FROM PLASTIC SHEET MATERIAL

[75] Inventor: Norman F. Houghton, Connersville, Ind.

[73] Assignee: Philco-Ford Corporation, Blue Bell, Pa.

[ * ] Notice: The portion of the term of this patent subsequent to Jan. 9, 1990, has been disclaimed.

[22] Filed: Oct. 19, 1973

[21] Appl. No.: 408,108

[52] U.S. Cl. .................................. 264/92, 425/388
[51] Int. Cl. ............................................. B29c 17/04
[58] Field of Search ............ 264/89, 90, 92, 93, 94, 264/96, 98, 292; 425/326, 387, 388

[56] References Cited
UNITED STATES PATENTS
3,709,968  1/1973  Houghton .............................. 264/92

Primary Examiner—Jan H. Silbaugh
Attorney, Agent, or Firm—Robert D. Sanborn; Harry W. Hargis, III

[57] ABSTRACT

In a vacuum-forming operation, four adjacent compartment liner sections are formed as an integral structure from a single sheet of thermoplastic material. Two pairs of adjacent molds, each having the desired shape of the inside surface of the corresponding liner section to be formed, are mounted along their base portions on frame structure hinged in regions of adjacency of the mold base portions, to provide for pivotation of the base portions so that confronting surfaces of the four molds are movable angularly toward and away from one another. A sheet of thermoplastic material disposed to extend over the molds is heat-softened, and then is ballooned upwardly while the molds are held in their pivoted positions, in which positions the confronting surfaces are substantially spaced from one another. A mold assist-plug and the pivoted molds are then moved, relative to one another, to urge the ballooned sheet into general close conformity with the molds. While the sheet of material is still soft, the mold frame structure is pivoted to cause adjacent wall portions of the molds to assume their closely spaced positions. Air entrapped between the heated sheet and the walls of the molds is then evacuated through a number of small ports, or vents, in the walls, thereby forming the desired integral liners, which are then cooled and stripped from the molds.

4 Claims, 7 Drawing Figures

METHOD FOR FORMING ARTICLES FROM PLASTIC SHEET MATERIAL

CROSS REFERENCE TO RELATED DISCLOSURE

This invention relates to improvements in the inventions disclosed and claimed in U.S. Pat. Nos. 3,709,968 and 3,724,989, issued Jan. 9, 1973, and Apr. 3, 1973, respectively, both of which Patents are assigned to the assignee of the present invention. The apparatus aspect of the present invention is claimed in copending application Ser. No. 466,956, filed May 6, 1974 which is assigned to the assignee of the present invention.

BACKGROUND OF THE INVENTION

This invention relates to the fabrication of articles from sheets of thermoplastic material, and is particularly concerned with an improved method for forming deep-drawn shapes, for example integrally molded multiple-compartment liners for refrigerator cabinets.

In producing an article of the aforementioned type, it is known to bring an assist-plug into contact with a heat-softened sheet of thermoplastic material to urge portions thereof onto a forming mold, after which the material is subjected to a vacuum, while in its heat-softened state, to effect the desired shape. In the fabrication of liners for multiple-compartment refrigerators from a single sheet it has been found especially difficult to control the thickness of the sheet in the regions of adjacency of the liners, due to the scarcity of material in these regions of close spacing between the several compartments.

It is an objective of this invention to provide an improved method of molding which overcomes the above mentioned difficulties, and which method is useful in the fabrication of multiple-compartment cabinet liners.

SUMMARY OF THE INVENTION

In achievement of the foregoing as well as other objectives, the invention contemplates a novel method for forming multiple compartment liners from a single sheet of thermoplastic material. The invention is particularly characterized by the provision of two pairs of adjacent molds each having the desired shape of one of the liners to be formed, preferably although not necessarily the shape of the inside surface, and each having vented wall sections. An assist-plug confronts the molds, and the molds and plug are relatively movable toward and away from one another in telescoping relationship. The molds are mounted along base portions thereof on frame structure so uniquely hinged, in the region of adjacency of said base portions, as to provide for pivotation of the several molds between a pivoted position in which confronting surfaces thereof are more widely spaced and a rest position in which the surfaces are more closely spaced. In the apparatus aspect of the invention it is an object to provide such pivotable mold structure.

In fabrication of a pair of liners in accordance with the method aspect of the invention, a sheet of thermoplastic material is placed between the assist-plug and the molds. The sheet of material is heated, causing it to soften while the molds are in their pivoted position in which the confronting surfaces are more widely spaced. The assist-plug and the molds are then moved relative to one another, to engage the heat-softened sheet and urge it onto the molds. This movement is followed by movement of the molds to non-pivoted, liner-forming position in which the confronting surfaces of the molds are in closely spaced, generally parallel, position. Air entrapped between the heated sheet and the molds is then removed through the large number of vents, or ports, in the walls thereof, thereby forming the desired liners which are subsequently cooled and stripped from the molds.

For a further understanding of the invention, and the manner in which the objectives and advantages thereof may best be achieved, reference is made to the following description, taken in light of the accompanying drawings.

DETAILED DESCRIPTION OF THE PREFERRED EMBODIMENT

Figure 1:
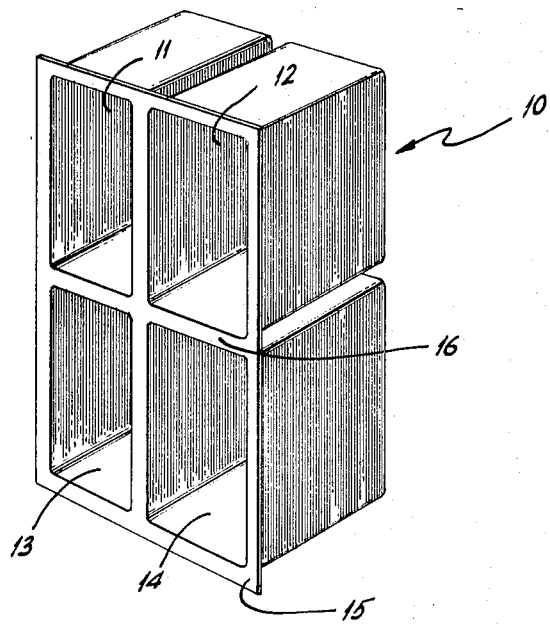
FIG. 1 is a perspective showing of a refrigerator storage compartment liner of a type made in accordance with the invention.

With reference to FIG. 1, a refrigerator liner 10 made according to the invention has four, integrally formed compartments 11 to 14, all surrounded by a peripheral flange 15, and each separated from an adjacent compartment by a web 16. The liner is made of a thermoplastic material and is molded from a single flat sheet of such material.

Figure 3:
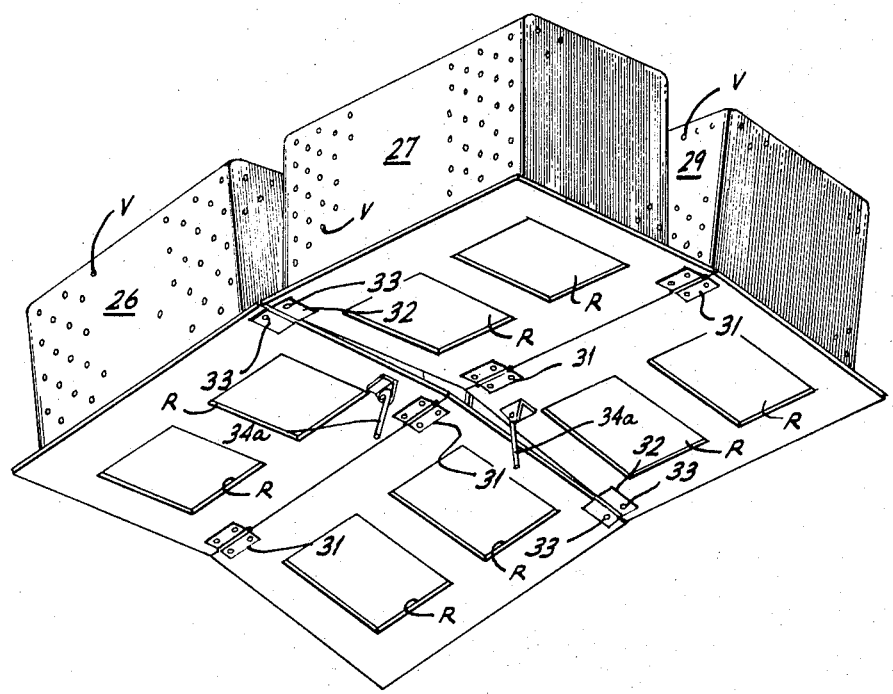
FIG. 3 is a perspective showing of the articulated mold structure appearing in FIG. 2, as seen from below.
Figure 2:
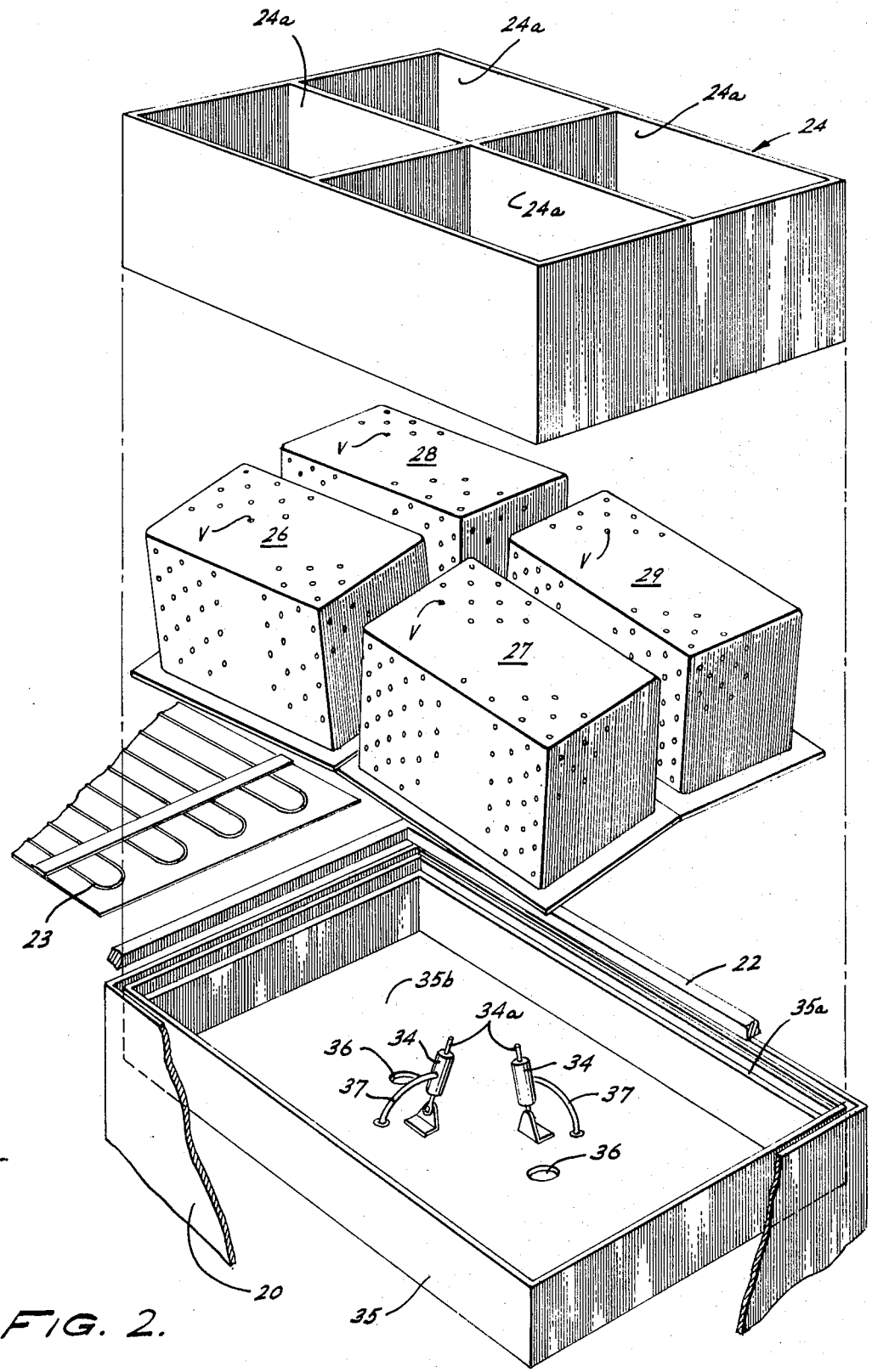
FIG. 2 is a perspective, partially exploded showing of apparatus including articulated mold structure for fabricating the compartment liner illustrated in FIG. 1.
Figure 4:
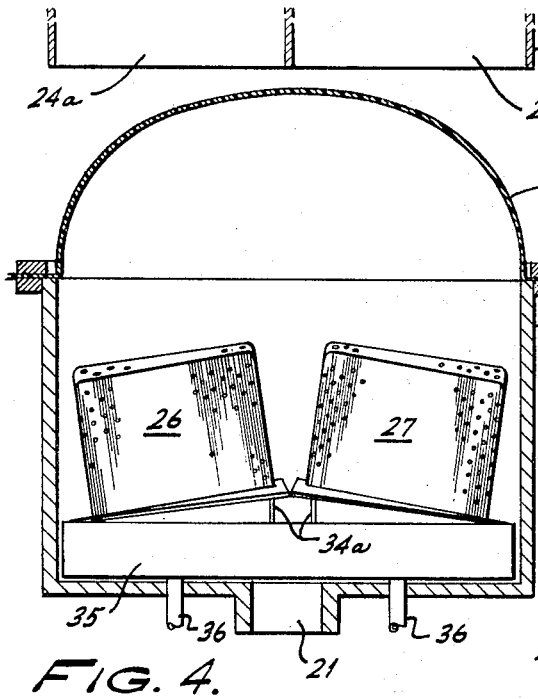
FIGS. 4 to 7 are sectional showings, on a lesser scale, of the apparatus seen in FIG. 2, and illustrating operational features thereof.

Molding of a liner of the above-described type is facilitated using apparatus illustrated in detail in FIGS. 2 and 3, and somewhat diagrammatically in FIGS. 4 to 7. The molding apparatus comprises an open top, generally box-shaped chamber 20 ported at 21 (FIGS. 4 to 7) to a suitable air pressure producing mechanism of suitable design (not shown). One such mechanism is disclosed and claimed in the copending application of Charles R. Wright, Ser. No. 361,344, filed May 17, 1973, now U.S. Pat. No. 3,838,962, and assigned to the assignee of the present invention. A clamping ring 22 closely surrounds the upper rim of chamber 20, and is constructed and arranged to clamp in place a sheet 17 of thermoplastic material (FIGS. 4 to 7,) for extension over the upper rim of the chamber. A radiant heater 23 (FIG. 2 only) is arranged to overlie sheet 17 to heat the same, and is mounted for lateral movements between an extended position (not shown) and the illustrated retracted position in which it is removed from above the sheet. An assist-plug 24, of generally rectangular overall shape, is disposed above molds 26 to 29, and has rectangular sub-sections 24a each aligned with a corresponding one of the molds. Molds 26 to 29 are adjacently positioned, and each has the general box shape of the inside surface of a compartment liner to be molded. Each of the molds 26 to 29 is provided with vents designated generally by the letter V. Relative movements between the assist-plug 24 and the molds is provided for by mounting both assist-plug 24 and the molds 26 to 29 for vertical movements, into and out of telescoping relationship with one another. No apparatus for mounting assist-plug 24 has been shown, since such apparatus can be entirely conventional in nature.

Still with reference to FIG. 2, and also to FIG. 3, an articulated base structure for the molds includes openings R beneath each mold as shown and is supported within a slightly recessed guide portion 35a of a generally rectangular, box-shaped frame 35 that is movable up-and-down, by any convenient means, for reasons to be more fully explained in what follows. A pair of hoses 36 terminate in a lower wall 35b of frame 35 and extend from the frame wall through walls of chamber 20 to a suitable vacuum source (not shown).

In especial accordance with the invention, and with special reference to FIG. 3, articulated base structure for the molds is so constructed and arranged that confronting walls of molds 26 to 29 are pivotable toward and away from one another in a unique and advantageous manner. Pivotation of the molds is afforded by two sets of hinges, one set comprising two pairs of hinges 31, and the other set comprising a pair of hinges 32. Each of hinges 31 is of the butt type having leaf portions rigidly affixed to adjacent base portions of the molds along one common side thereof. Each of hinges 32 also is of the butt type, except that each of their hinge leaf portions are pinned, as seen at 33, to adjacent base portions of the molds that extend transversely of the line of extent of the other adjacent base portions interconnected by hinges 31. In the illustrated embodiment, the relationship of the base portions is such that respective axes of hinges 31 and 32 extend at substantially right angles to one another.

In order to effect the above described pivotal movements of the molds as afforded by hinges 31 and 32, an upwardly directed force is applied to the central region of the four-mold unit, for example by a pair of pneumatically activated linkage each including a cylinder 34 and a piston rod 34a connected to a corresponding pressure hose 37. Each of the cylinders 34 is pinned to the lower wall 35b of frame 35 and piston rods 34a are pinned to diagonally opposed base portions of the molds. Introduction of pressure to cylinders 34 extend rods 34a to pivot the base portions of the molds relative to one another both about the axes of hinges 31, and about the axes of hinges 32 as the leaf portions thereof turn on their pivots 33 on the base portions. The pivoted mold positions, and the manner of hinging, are seen to advantage in FIG. 3.

In effect, hinges 32 are two-way pivotation devices affording both upward and lateral pivotation of the molds about one set of their opposed sides. Hinges 31 accommodate the upward pivotation on the molds about their other set of opposed edge portions. The recessed portion 35a of frame 35 serves as a supporting guide for the mold base portions as they are pivoted, thereby assuring proper mold alignment and retention.

Operation of the apparatus will now be explained with reference to FIGS. 4 to 7. Beginning with FIG. 4, a sheet of clamped-in-place thermoplastic material has been heated as noted above, and then ballooned upwardly to the position shown by introduction of appropriate air pressure through port 21 to chamber 20. Molds 26 to 29, and frame 35, are in their retracted positions within chamber 20, and assist-plug 24 is in its upper or retracted, position. Also it is seen that molds 26 to 29 are held in their upwardly pivoted positions, while in chamber 26.

Figure 5:
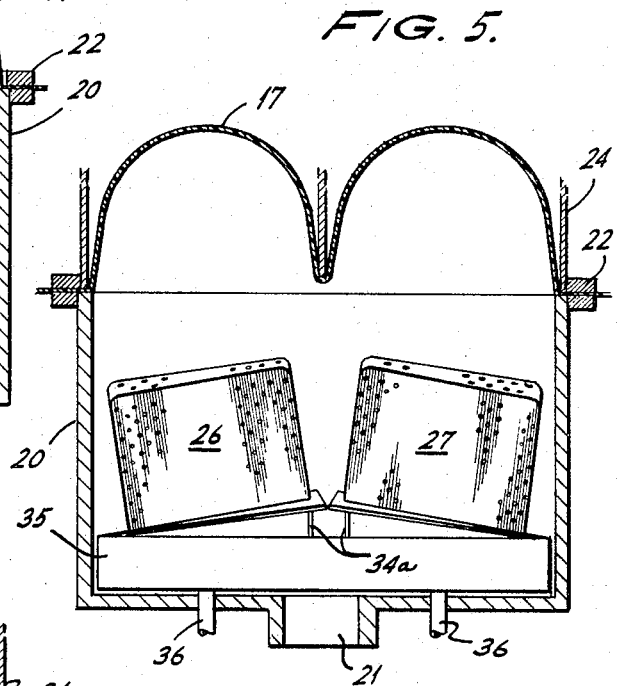

With reference to FIG. 5, assist-plug 24 is moved downwardly to a position engaging ballooned sheet 17 to form upwardly ballooned sections of lesser size within each assist-plug section 24a. Only two of the ballooned sections are shown for convenience of illustration, as is the case with the assist-plug and the molds, in which latter connection only the molds designated 26 and 27 are shown in FIGS. 4 to 7.

Figure 6:
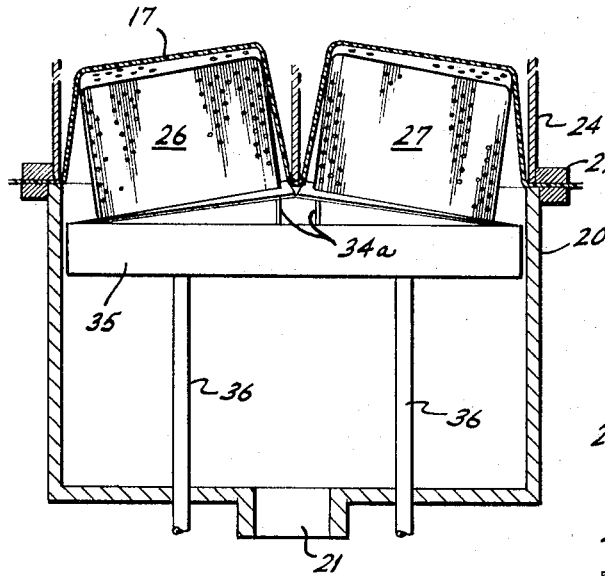

Referring to FIG. 6, mold frame 35 along with molds 26 to 29 are moved upwardly to a position in which each of the individual molds enters its corresponding ballooned section of sheet 17, as formed by assist-plug sections 24a, to engage the sheet and further stretch the same.

Figure 7:
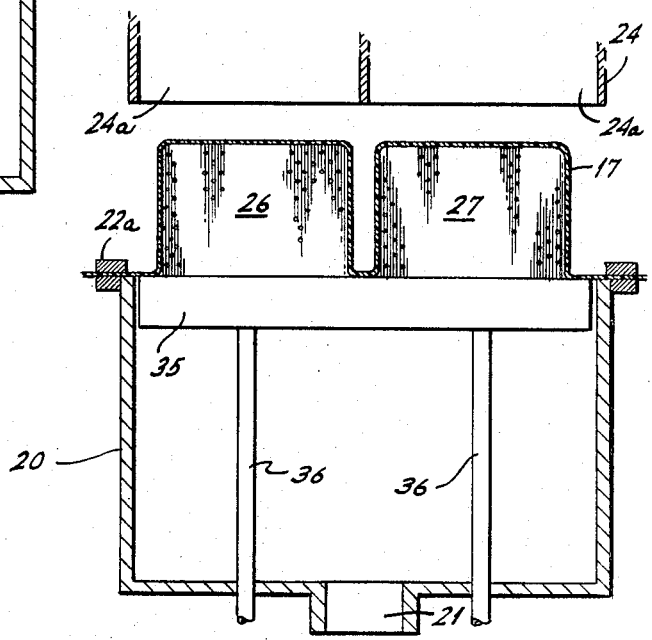

Frame 35 is then fully elevated to the position shown in FIG. 7, accompanied by de-pressurization of pneumatic cylinder 34, to retract piston rod 34a and move molds 26 to 29 to their illustrated non-pivoted positions. A vacuum is then drawn through hoses 36, and, through the agency of openings R and vents V, causes the softened plastic sheet 17 to conform to molds 26 to 29. Assist-plug 24 is then elevated to the position shown also in FIG. 7, whereupon slight pressure is applied to interior regions of the molds, through hoses 36, to release the molded liner for its subsequent removal from the molds and trimming about the edges, to arrive at the multi-compartment liner as described in connection with FIG. 1.

A further feature of the invention resides in the fact that a three compartment liner can be molded. For example, compartments 11 and 13 could be combined to form a single, elongate compartment merely by omitting the portion of assist plug sections 24a extensible between molds 26 and 27, and configuring the confronting walls of these molds so that they substantially engage one another in their non-pivoted positions, effectively forming a single elongate mold. This as well as other modifications are contemplated by the scope of the appended claims.

From the foregoing it will be appreciated that the invention affords an improved molding apparatus and method useful in the forming of multiple compartment refrigerator cabinet liners from single sheets of thermoplastic material, which liners are advantageously characterized by substantially uniform wall thickness.

I claim:

1. In a method of forming a unitary article, comprising at least a pair of adjacent walled structures having unidirectionally presented openings, from a unitary sheet of thermoplastic material, utilizing at least a pair of substantially unidirectionally presented molds shaped in correspondence to the structures to be formed and so associated as to be pivotable both about an edge of its base and in the plane of its base between one position in which confronting walls therof are closely spaced in accordance with the spacing of the structures to be formed and another position in which said confronting walls are spaced apart a substantially greater distance than in said one position, the steps which comprise: causing a heat softened unitary sheet of thermoplastic material to extend over, and central portions thereof to occupy space between, such molds when the latter are in the mentioned other position in which the confronting walls of said molds are substantially spaced; utilizing an assist plug structure to move said central portion of said sheet of material into the regions between said molds; pivoting said molds in the recited two directions to said one position in which they are closely spaced; and utilizing differential fluid pressure to cause said sheet to conform to surfaces of said molds in said one, closely spaced position.

2. In a method of forming a unitary article, comprising at least a pair of adjacent walled structures having unidirectionally presented open portions, from a unitary sheet of thermoplastic material, utilizing at least a pair of substantially unidirectionally presented molds shaped in correspondence to the structures to be formed and so associated as to be pivotally movable about a pair of axes extending with angularity as respects one another, between one position in which confronting walls thereof are closely spaced in accordance with the spacing of the structures to be formed, and another position in which said confronting walls are spaced apart a substantially greater distance than in said one position, the steps which comprise: utilizing assist plug means movable to force a unitary heat-softened sheet of thermoplastic material onto said unidirectionally presented molds, with central portions of said sheet draped therebetween, while said molds occupy the recited other position in which their confronting walls are substantially spaced; pivoting said molds about the recited axes to said one position in which they are closely spaced, upon movement of said assist plug means, to force said central portions of said sheet into the regions between said closely spaced molds; and utilizing differential fluid pressure to cause said sheet to conform to the surfaces of said molds in said one, closely spaced position.

3. In a method of forming a unitary article, comprising at least three adjacent, generally rectangular walled structures having unidirectionally presented open portions from a unitary sheet of thermoplastic material, at least one of said walled structures having adjacent sides confronting sides of a second and a third one of said walled structures, respectively, utilizing a plurality of substantially unidirectionally presented molds corresponding in number and shaped in correspondence to the structures to be formed and so associated as to be pivotally movable about a pair of axes extending with angularity as respects one another, between one position in which respective pairs of confronting walls thereof are closely spaced in accordance with the spacing of the structures to be formed, and another position in which said confronting walls are spaced apart a substantially greater distance than in said one position, the steps which comprise: utilizing assist plug means movable to force a unitary heat-softened sheet of thermoplastic material into said unidirectionally presented molds, with central portions of said sheet draped therebetween, while said molds occupy the recited other position in which their confronting walls are substantially spaced; pivoting said molds about the recited axes to said one position in which their confronting walls are closely spaced, upon movement of said assist plug means, to force said central portions of said sheet into the regions between said closely spaced molds; and utilizing differential fluid pressure to cause said sheet to conform to the surfaces of said molds in said one, closely spaced position.

4. The method of claim 3 wherein the assist plug means urges respective portions of said sheet of thermoplastic material into general conformity with each of said molds.

* * * * *